(12) United States Patent
Wiesen et al.

(10) Patent No.: US 10,559,319 B2
(45) Date of Patent: *Feb. 11, 2020

(54) SELECTABLE MAGNETIC WRITERS OF DIFFERENT TARGET GEOMETRIES FOR REDUCING PERFORMANCE VARIANCE

(71) Applicant: Seagate Technology LLC, Cupertino, CA (US)

(72) Inventors: Kurt Wiesen, Lyons, CO (US); Javier Guzman, Minneapolis, MN (US); Joseph Mundenar, Eden Prairie, MN (US); Michael Conover, Edina, MN (US)

(73) Assignee: SEAGATE TECHNOLOGY LLC, Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/360,770

(22) Filed: Mar. 21, 2019

(65) Prior Publication Data

US 2019/0221229 A1    Jul. 18, 2019

Related U.S. Application Data

(60) Continuation of application No. 15/813,374, filed on Nov. 15, 2017, now Pat. No. 10,325,619, which is a
(Continued)

(51) Int. Cl.
*G11B 5/127* (2006.01)
*G11B 27/36* (2006.01)
(Continued)

(52) U.S. Cl.
CPC .......... *G11B 5/1272* (2013.01); *G11B 5/3116* (2013.01); *G11B 7/00* (2013.01);
(Continued)

(58) Field of Classification Search
None
See application file for complete search history.

(56) References Cited

U.S. PATENT DOCUMENTS

| 4,504,880 A | 3/1985 | Church et al. |
| 4,636,902 A | 1/1987 | Dalziel et al. |

(Continued)

FOREIGN PATENT DOCUMENTS

| JP | 59-79408 A | 5/1984 |
| JP | S63103408 A | 5/1988 |

(Continued)

OTHER PUBLICATIONS

Prosecution history of U.S. Appl. No. 14/996,833, filed Jan. 15, 2016, including: Notice of Allowance dated Nov. 9, 2017, 5 pages; Notice of Allowance dated Jul. 12, 2017, 8 pages; Non-Final Rejection dated Mar. 22, 2017, 12 pages; Requirement for Restriction/Election dated Oct. 19, 2016, 7 pages; 32 pages total.

(Continued)

*Primary Examiner* — Tan X Dinh
(74) *Attorney, Agent, or Firm* — Westman, Champlin & Koehler, P.A.

(57) ABSTRACT

A method of forming a recording head for use with a data storage medium in a data storage device. The method includes forming first and second writers of different target geometries. A first recording measurement is performed on one or more storage media using the first writer. A second recording measurement is performed on the one or more storage media using the second writer. Based on a comparison of the first and second recording measurements to a predetermined quantity, either the first writer or the second writer is selected to be operational in the data storage device.

20 Claims, 10 Drawing Sheets

Related U.S. Application Data division of application No. 14/996,833, filed on Jan. 15, 2016, now Pat. No. 9,865,301.

(60) Provisional application No. 62/266,431, filed on Dec. 11, 2015.

(51) Int. Cl.
*G11B 5/31* (2006.01)
*G11B 7/00* (2006.01)
*G11B 5/133* (2006.01)
*G11B 20/10* (2006.01)

(52) U.S. Cl.
CPC ............ *G11B 27/36* (2013.01); *G11B 5/1335* (2013.01); *G11B 5/3163* (2013.01); *G11B 20/10388* (2013.01)

(56) References Cited

U.S. PATENT DOCUMENTS

| | | | |
|---|---|---|---|
| 4,962,437 A | 10/1990 | Wilcox | |
| 5,050,169 A | 9/1991 | Monett | |
| 5,285,341 A | 2/1994 | Suzuki et al. | |
| 5,602,704 A * | 2/1997 | Gooch | G11L 35/10 360/125.38 |
| 5,742,995 A | 4/1998 | Amin et al. | |
| 5,799,388 A | 9/1998 | Shouji | |
| 5,896,249 A | 4/1999 | Fontana, Jr. et al. | |
| 6,104,562 A | 8/2000 | Ottesen et al. | |
| 6,249,890 B1 | 6/2001 | Ukani et al. | |
| 6,320,714 B1 | 11/2001 | Moon et al. | |
| 6,373,649 B1 | 4/2002 | Walker et al. | |
| 6,424,475 B1 | 7/2002 | Bhandari et al. | |
| 6,459,260 B1 | 10/2002 | Bonin et al. | |
| 6,729,013 B2 | 5/2004 | Sasaki | |
| 6,735,062 B1 | 5/2004 | Pokhil et al. | |
| 6,884,148 B1 | 4/2005 | Dovek et al. | |
| 6,956,722 B2 | 10/2005 | Wada et al. | |
| 6,987,637 B2 * | 1/2006 | Litvinov | G11L 35/012 360/76 |
| 7,075,761 B2 | 7/2006 | Parker | |
| 7,102,842 B1 | 9/2006 | Howard et al. | |
| 7,236,392 B2 | 6/2007 | Saruki et al. | |
| 7,508,619 B2 | 3/2009 | Okamoto et al. | |
| 7,532,437 B2 | 5/2009 | Liu et al. | |
| 8,289,644 B2 | 10/2012 | Holmberg | |
| 8,289,662 B2 | 10/2012 | Iben | |
| 8,310,782 B2 | 11/2012 | Song et al. | |
| 8,339,752 B1 | 12/2012 | Hattori et al. | |
| 8,502,332 B2 | 8/2013 | Sasaki et al. | |
| 8,552,716 B2 | 10/2013 | Ueda et al. | |
| 8,582,251 B2 | 11/2013 | Gao et al. | |
| 8,693,126 B2 | 4/2014 | Buckholdt et al. | |
| 8,724,265 B2 | 5/2014 | Qiu et al. | |
| 9,064,504 B1 | 6/2015 | Sannino et al. | |
| 9,099,103 B1 | 8/2015 | Krichevsky | |
| 9,099,125 B1 | 8/2015 | Hattori et al. | |
| 9,142,246 B1 | 9/2015 | Trantham et al. | |
| 9,251,844 B1 | 2/2016 | Wheelock et al. | |
| 9,251,856 B1 | 2/2016 | Wheelock et al. | |
| 9,286,926 B1 | 3/2016 | Dhanda et al. | |
| 9,299,369 B1 | 3/2016 | Biskeborn et al. | |
| 9,361,916 B1 | 6/2016 | Chung et al. | |
| 9,387,568 B1 | 7/2016 | Ilaw et al. | |
| 9,396,745 B2 | 7/2016 | Macken et al. | |
| 9,401,161 B1 | 7/2016 | Jury et al. | |
| 9,401,167 B2 | 7/2016 | Pokharel et al. | |
| 9,431,031 B1 | 8/2016 | Xiao et al. | |
| 9,536,550 B1 | 1/2017 | Ma et al. | |
| 9,558,774 B1 | 1/2017 | Macken | |
| 9,576,597 B2 | 2/2017 | Trantham et al. | |
| 9,613,642 B1 | 4/2017 | Erden et al. | |
| 9,773,517 B2 * | 9/2017 | Gao | G11B 5/4984 |
| 9,805,744 B1 * | 10/2017 | Xue | G11B 5/3116 |
| 9,818,445 B2 * | 11/2017 | Zhu | G11B 20/1217 |
| 9,858,961 B2 * | 1/2018 | Zhu | G11B 20/1217 |
| 9,865,301 B1 * | 1/2018 | Wiesen | G11B 27/36 |
| 9,947,357 B2 | 4/2018 | Rausch et al. | |
| 9,990,941 B1 | 6/2018 | Sapozhnikov et al. | |
| 10,049,690 B1 | 8/2018 | Sapozhnikov et al. | |
| 2002/0075595 A1 * | 6/2002 | Sato | B82Y 10/00 360/125.06 |
| 2002/0112343 A1 | 8/2002 | Goubau et al. | |
| 2004/0042118 A1 * | 3/2004 | Notsuke | G11B 5/1278 360/125.6 |
| 2004/0130321 A1 | 7/2004 | Kasajima et al. | |
| 2006/0002021 A1 * | 1/2006 | Li | G11B 5/1278 360/125.06 |
| 2006/0044677 A1 * | 3/2006 | Li | G11B 5/1278 360/122 |
| 2007/0236819 A1 | 10/2007 | Hashizume | |
| 2008/0024900 A1 * | 1/2008 | Okamoto | G11L 35/012 360/70 |
| 2008/0036455 A1 | 2/2008 | Beach et al. | |
| 2008/0084430 A1 | 4/2008 | Sakakura | |
| 2008/0204913 A1 | 8/2008 | Umezaki et al. | |
| 2008/0231985 A1 | 9/2008 | Okamoto | |
| 2009/0161243 A1 | 6/2009 | Sharma et al. | |
| 2009/0208777 A1 | 8/2009 | Ito et al. | |
| 2009/0251821 A1 | 10/2009 | Song et al. | |
| 2010/0007986 A1 | 1/2010 | Mak et al. | |
| 2010/0146773 A1 | 6/2010 | Li et al. | |
| 2010/0302662 A1 | 12/2010 | Toba et al. | |
| 2011/0007426 A1 | 1/2011 | Qiu et al. | |
| 2011/0050211 A1 | 3/2011 | Gao et al. | |
| 2011/0051294 A1 | 3/2011 | Gao et al. | |
| 2011/0134572 A1 | 6/2011 | Qiu et al. | |
| 2012/0206830 A1 | 8/2012 | Gao et al. | |
| 2013/0286502 A1 | 10/2013 | Erden et al. | |
| 2013/0286511 A1 | 10/2013 | Edelman et al. | |
| 2013/0314816 A1 | 11/2013 | Gao et al. | |
| 2014/0063644 A1 | 3/2014 | Lou et al. | |
| 2014/0153134 A1 | 6/2014 | Han et al. | |
| 2015/0009787 A1 | 1/2015 | Rausch et al. | |
| 2015/0117173 A1 | 4/2015 | Green et al. | |
| 2015/0248904 A1 | 9/2015 | Aoyama et al. | |
| 2016/0125900 A1 | 5/2016 | Biskeborn et al. | |
| 2018/0082714 A1 * | 3/2018 | Wiesen | G11B 27/36 |
| 2018/0268920 A1 | 9/2018 | Kobayashi et al. | |
| 2019/0147908 A1 | 5/2019 | Klarqvist | |

FOREIGN PATENT DOCUMENTS

| | | |
|---|---|---|
| JP | 2003-91805 A | 3/2003 |
| JP | 2005-56515 A | 3/2005 |
| JP | 2005-339781 A | 12/2005 |
| JP | 2008-84430 A | 4/2008 |
| JP | 2011-123935 A | 6/2011 |

OTHER PUBLICATIONS

Office Action from U.S. Appl. No. 15/350,797, dated Sep. 18, 2017, 10 pages.

Wang, Shan X. et al., "Magnetic Information Storage Technology", Chapter 5—Inductive Magnetic Heads, 5.2 Fabrication of Thin-Film Inductive Films, Copyright © 1999 by Academic Press, 7 pages.

Wang, Yangfan, "Design and Optimization of Collocated Dual Stage Actuated Suspensions in Hard Disk Drives Using Finite Element Analysis", UC San Diego, UC San Diego Electronic Theses and Dissertations, Publication Date: Jan. 1, 2015, 66 pages.

Prosecution history of U.S. Appl. No. 15/813,374, filed Nov. 15, 2017, including: Notice of Allowance dated Nov. 28, 2018, 6 pages; Notice of Allowance dated Jul. 18, 2018, 5 pages; Applicant Initiated Interview Summary dated Apr. 11, 2018, 3 pages; Non-Final Rejection dated Mar. 8, 2018, 11 pages; 25 pages total.

Requirement for Restriction for U.S. Appl. No. 15/980,042, dated Nov. 14, 2018, 10 pages.

Non-Final Rejection for U.S. Appl. No. 15/980,042, dated Feb. 21, 2019, 11 pages.

(56) References Cited

OTHER PUBLICATIONS

USPTO-issued prosecution history for U.S. Appl. No. 15/671,482, including: Notice of Allowance and Fee(s) Due dated Apr. 17, 2018, 11 pages; and Requirement for Restriction/Election dated Feb. 1, 2018, 14 pages; 25 pages total.
Requirement for Restriction/Election for U.S. Appl. No. 15/350,797, dated Jun. 14, 2017, 13 pages.
Notice of Allowance and Fee(s) Due for U.S. Appl. No. 15/350,797, dated Feb. 9, 2018, 9 pages.
Requirement for Election for U.S. Appl. No. 16/055,699, dated Oct. 5, 2018, 10 pages.
Non-Final Rejection for U.S. Appl. No. 16/055,699, dated Feb. 4, 2019, 10 pages.
Notice of Allowance and Fee(s) Due for U.S. Appl. No. 16/055,699, dated Jun. 5, 2019, 11 pages.
Notice of Allowance and Fee(s) Due for U.S. Appl. No. 15/980,042, dated Jun. 21, 2019, 10 pages.

* cited by examiner

SELECTABLE MAGNETIC WRITERS OF DIFFERENT TARGET GEOMETRIES FOR REDUCING PERFORMANCE VARIANCE

The present application is a continuation application of U.S. application Ser. No. 15/813,374, filed on Nov. 15, 2017, which published as U.S. Publication No. 2018-0082714 A1 on Mar. 22, 2018, which is a divisional application of U.S. application Ser. No. 14/996,833, filed Jan. 15, 2016, which issued as U.S. Pat. No. 9,865,301 on Jan. 9, 2018, which claims priority to U.S. Provisional Application No. 62/266,431, filed Dec. 11, 2015 and entitled "SELECTABLE WRITERS FOR REDUCED PERFORMANCE VARIANCE, AND SELECTION METHOD THEREOF," the contents of which are hereby incorporated by reference in their entireties.

BACKGROUND

Data storage devices, such as disc drives, use magnetic recording heads to read and/or write data on magnetic storage media, such as a data storage discs. In a typical disc drive, one or more discs are mounted on a spindle motor, which causes the disc(s) to spin. Recording heads carried by a slider are used to read from and write to data tracks on the disc(s). The slider is typically carried by a head arm assembly that includes an actuator arm and a suspension assembly. During operation, as the disc spins, the slider glides above the surface of the disc on a small cushion of air, for example, and the actuator arm pivots to movably position the slider with respect to the disc.

As areal recording densities for storage discs increase, technological advances and changes to various components of the disc drives are needed.

SUMMARY

The present disclosure relates to fabrication of writers (for example, two substantially coplanar writers), each having a different process variance, and then selecting one of the writers that is most suitable for operation in a data storage device such as a disc drive.

In one embodiment, a method of forming a recording head is provided. The method includes forming first and second writers of different target geometries. A first recording measurement is performed on a storage medium using the first writer. A second recording measurement is performed on the storage medium using the second writer. Based on a comparison of the first and second recording measurements to a predetermined quantity, either the first writer or the second writer is selected to be operational in a data storage device.

In another embodiment, a data storage device is provided. The data storage device includes one or more data storage media and at least one recording head. The recording head has substantially coplanar first and second writers of different geometries. Only one of the first or the second writer is configured to be operational to record user data on the one or more data storage media.

In yet another embodiment, a method is provided that includes forming a plurality of writers with each of the plurality of writers having a different target geometry. The method also includes performing recording measurements on one or more storage media using each different one of the plurality of writers. The method further includes selecting one of the plurality of writers to be operational in a data storage device based on a comparison of the recording measurements of the different ones of the plurality of writers to a predetermined quantity.

Other features and benefits that characterize embodiments of the disclosure will be apparent upon reading the following detailed description and review of the associated drawings.

DETAILED DESCRIPTION OF ILLUSTRATIVE EMBODIMENTS

Embodiments described below relate to fabrication of writers (for example, two substantially coplanar writers), each having a different process variance, and then selecting one of the writers that is most suitable for operation in a data storage device such as a disc drive. However, prior to providing additional details regarding the different embodiments, a description of an illustrative operating environment is provided below.

Figure 1:
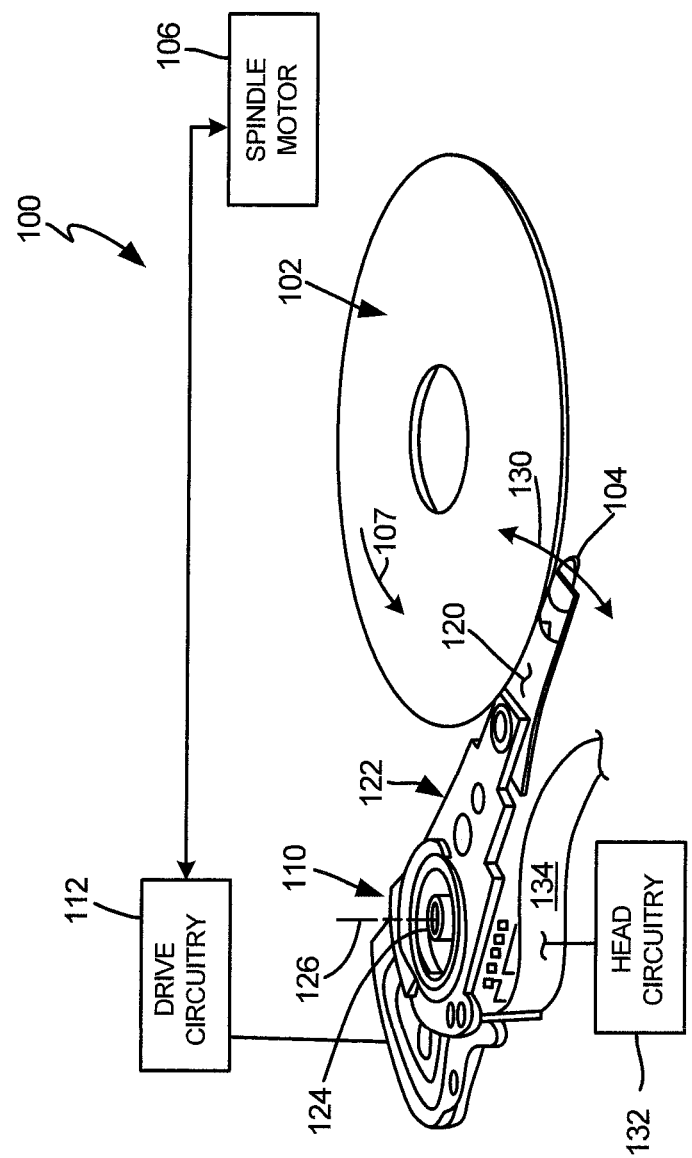
FIG. 1 illustrates an embodiment of a data storage device in which embodiments of the present application can be used.

FIG. 1 shows an illustrative operating environment in which certain writer embodiments formed as disclosed herein may be incorporated. The operating environment shown in FIG. 1 is for illustration purposes only. Embodiments of the present disclosure are not limited to any particular operating environment such as the operating environment shown in FIG. 1. Embodiments of the present disclosure are illustratively practiced within any number of different types of operating environments. It should be noted that the same reference numerals are used in different figures for same or similar elements.

FIG. 1 is a schematic illustration of a data storage device 100 including a data storage medium and a head for reading data from and/or writing data to the data storage medium. As shown in FIG. 1, the data storage device 100 includes a magnetic data storage medium or disc 102 and a head 104. The head 104 including transducer elements (not shown in FIG. 1) is positioned above the data storage medium 102 to read data from and/or write data to the data storage medium 102. In the embodiment shown, the data storage medium 102 is a rotatable disc or other magnetic storage medium that includes a magnetic storage layer or layers. For read and write operations, a spindle motor 106 (illustrated schematically) rotates the medium 102 as illustrated by arrow 107 and an actuator mechanism 110 positions the head 104 relative to data tracks on the rotating medium 102. Both the spindle motor 106 and actuator mechanism 110 are connected to and operated through drive circuitry 112 (schematically shown). The head 104 is coupled to the actuator mechanism 110 through a suspension assembly which includes a load beam 120 connected to an actuator arm 122 of the mechanism 110 for example through a swage connection.

The transducer elements of the head 104 are coupled to head circuitry 132 through flex circuit 134, also known as printed circuit cable assembly (PCCA), to encode and/or decode data. Although FIG. 1 illustrates a single load beam 120 coupled to the actuator mechanism 110, additional load beams 120 and heads 104 can be coupled to the actuator mechanism 110 to read data from or write data to multiple discs of a disc stack. The actuator mechanism 110 is rotationally coupled to a frame or deck (not shown) through a bearing 124 to rotate about axis 126. Rotation of the actuator mechanism 110 moves the head 104 in a cross track direction as illustrated by arrow 130.

Figure 2:
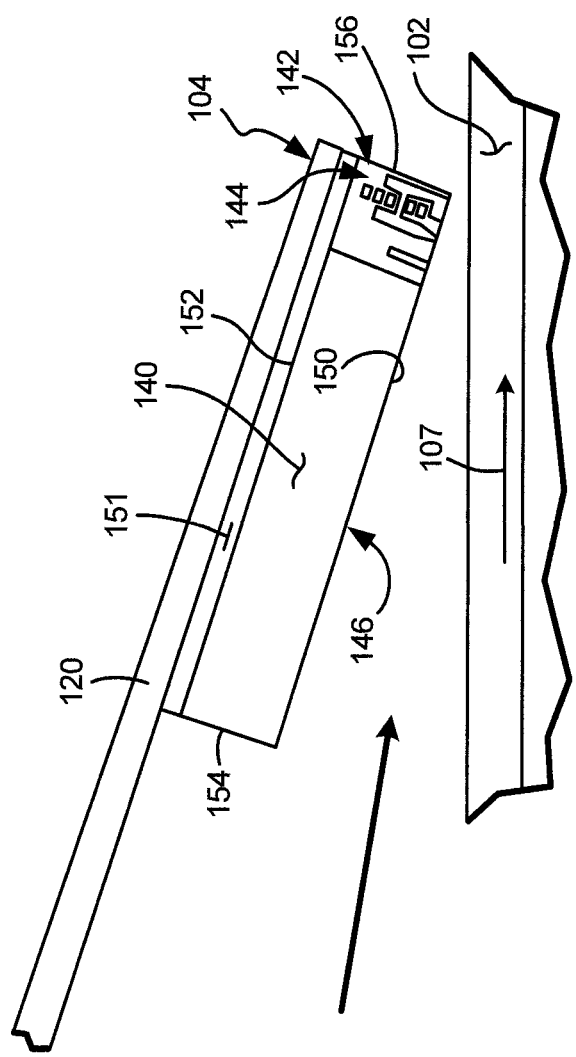
FIG. 2 is a schematic illustration of a head including one or more transducer elements above a magnetic recording medium.

FIG. 2 is a detailed illustration (side view) of the head 104 above the medium 102. The transducer elements on the head 104 are fabricated on a slider 140 to form a transducer portion 142 of the head 104. The transducer portion 142 shown includes write elements encapsulated in an insulating structure to form a write assembly 144 of the head. As shown, the head 104 includes a bearing surface (for example, and air bearing surface (ABS)) 146 along a bottom surface 150 of the head or slider facing the medium 102. The head 104 is coupled to the load beam 120 through a gimbal spring 151 coupled to a top surface 152 of the head or slider 140 facing away from the medium 102. The medium 102 can be a continuous storage medium, a discrete track medium, a bit patterned medium or other magnetic storage medium including one or more magnetic recording layers.

During operation, rotation of the medium or disc 102 creates an air flow in direction 107 as shown in FIG. 2 along the air bearing surface 146 of the slider 140 from a leading edge 154 to the trailing edge 156 of the slider 140 or head 104. Air flow along the air bearing surface 146 creates a pressure profile to support the head 104 and slider 140 above the medium 102 for read and/or write operations. As shown, the transducer portion 142 is formed at or near the trailing edge 156 of the slider 140. A description of a general embodiment for forming of a transducer portion such as 142 on a wafer is provided below in connection with FIG. 3. Thereafter, details regarding specific embodiments are provided.

Figure 3:
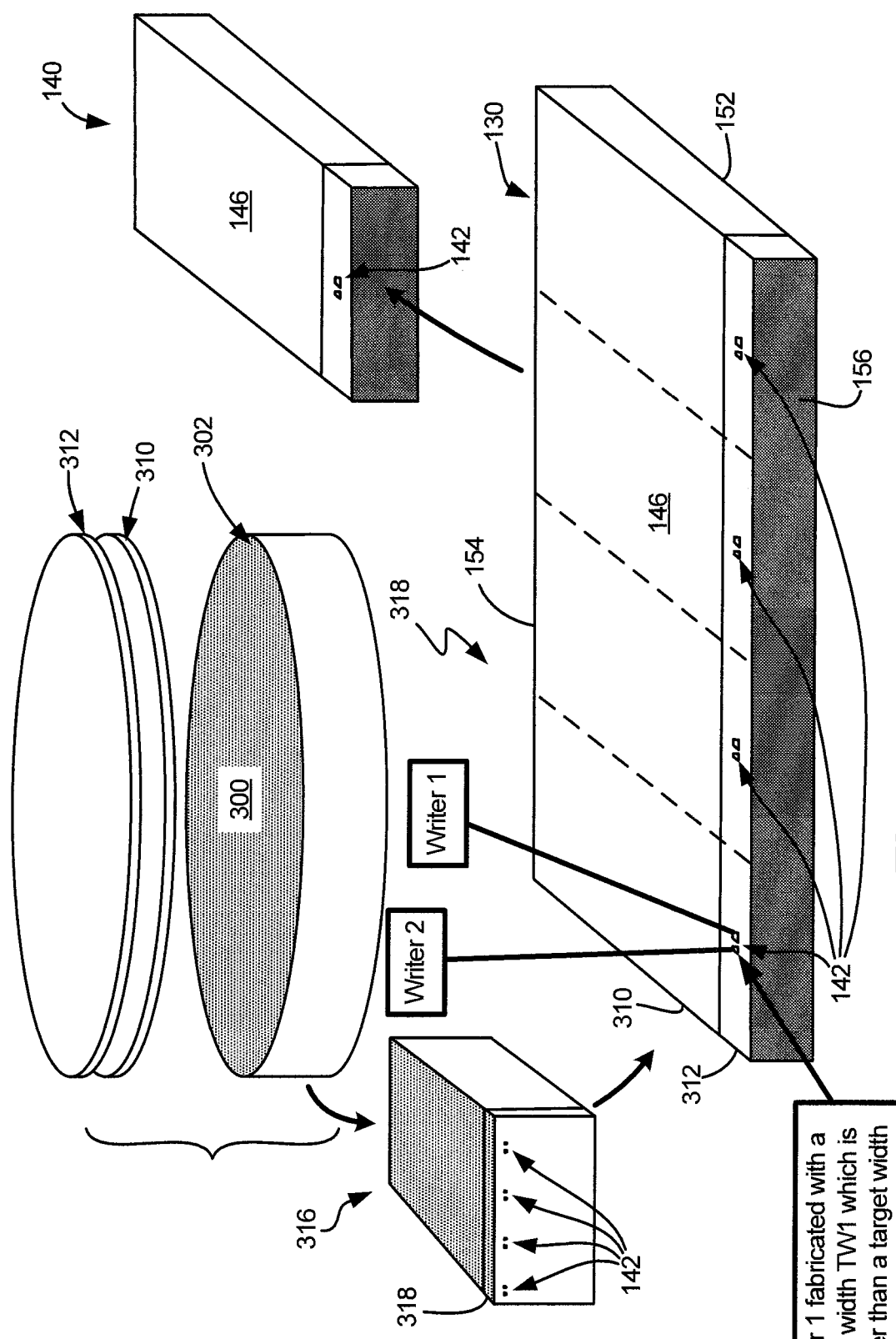
FIG. 3 is a schematic illustration of a wafer fabrication sequence for heads of a data storage device.

FIG. 3 is a schematic illustration of a wafer fabrication sequence for heads of a data storage device. As shown in FIG. 3, multiple thin film deposition layers are deposited on a surface 300 of a wafer or substrate 302 to form transducer elements 142 (illustrated schematically in FIG. 3). As shown, the multiple deposition layers include one or more read element layers 310 and write element layers 312. The read and write element layers 310, 312 are illustrated schematically in FIG. 3. Following deposition of the read and write element layers 310, 312, the wafer 302 is sliced into a bar chunk 316. The bar chunk 316 includes a plurality of slider bars 318 (one slider bar 318 is shown exploded from the chunk 316).

The sliced bars 318 have a leading edge 154, a trailing edge 156, a bearing surface (for example, an air bearing surface (ABS)) 146 and a back/top surface 152. After the bars 318 are sliced from chunks 316, the transducer elements 142 (read and write elements) deposited on the wafer 302 are orientated along the air bearing surface(s) 146 at the trailing edge 156 of the slider bar 318. The slider bar 318 is sliced to form the sliders 140. Typically, the bar 318 is lapped and the bearing surface(s) 146 are etched prior to slicing the bar 318 to form the individual sliders 140. Illustratively, the wafer 302 is formed of a ceramic material such as alumina ($Al_2O_3$)—titanium carbide (Ti—C). The read and write elements are fabricated on the ceramic or substrate material of the wafer 302 to form a slider body 140 of the head, and the one or more deposition layers 310, 312 form the transducer elements 142 along the trailing edge 156 of the slider body 140.

In one embodiment, fabrication of write element layer(s) 312 is carried out such that a first writer (Writer 1) of each recording head has a first target width TW1 and a second writer of each recording head has a second target width TW2. One target width (for example, TW1) is selected to be wider than a median target width and the other target width (for example, TW2) is selected to be narrower than the median target width. In such an embodiment, if the fabrication process drifts wider, the writer(s) formed with the selected narrower target width (for example, TW2) will have actual widths that are closer to the median target width. Similarly, if the fabrication process drifts narrower, the writer(s) formed with the selected wider target width (for example, TW1) will have actual widths that are closer to the median target width. A single writer formed by such a method is described below in connection with FIG. 4.

Figure 4:
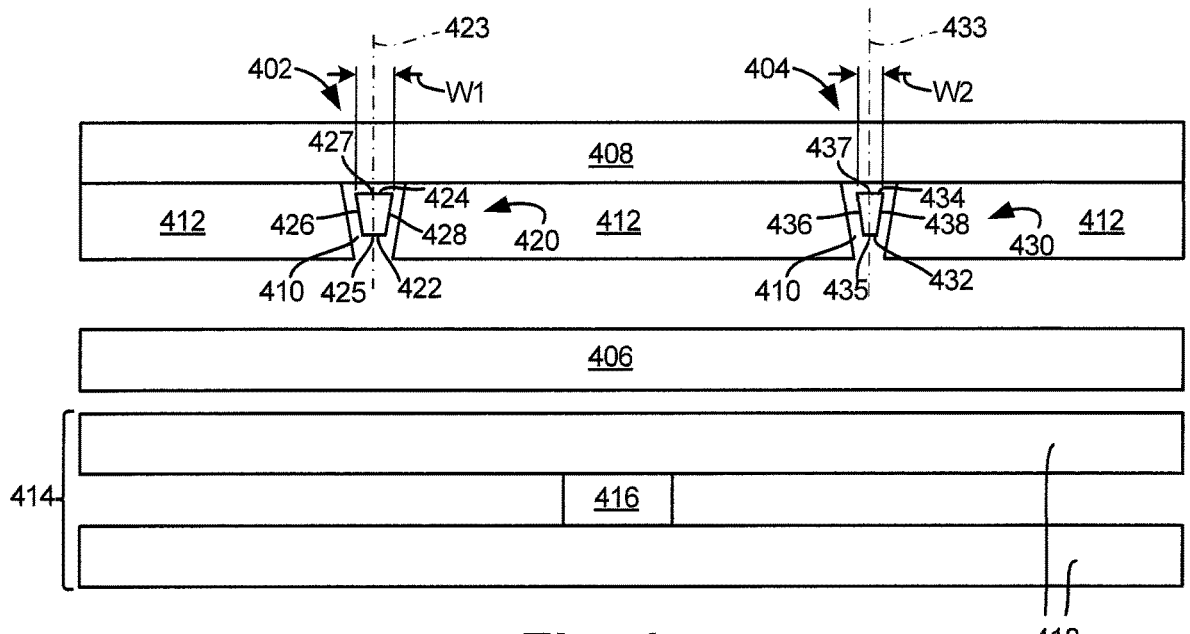
FIG. 4 is a view of an embodiment of a recording head viewed from an ABS.

FIG. 4 is a view of an embodiment of a recording head 400 viewed from an ABS. Recording head 400 is formed by a fabrication process that employs different target widths (for example, TW1 and TW2 described above) for individual writers of the recording head 400. In the embodiment of FIG. 4, recording head 400 includes two substantially coplanar writers denoted by reference numerals 402 and 404, respectively. As will be described further below, only one of writers 402 and 404 is selected to be operational to record user data on one or more data storage media such as 102 (of FIG. 1). Head 400 also includes a first return pole 406, a second return pole (or front shield) 408, side shields 412, insulator gaps 410 and a reader assembly 414. The reader assembly 414 includes a read sensor element 416 positioned between a pair of reader shields 418.

First writer (Writer 1) 402 includes a main pole that defines a pole tip 420. In the embodiment shown in FIG. 4, pole tip 420 has a trapezoidal shape along the ABS. A perimeter of pole tip 420 is defined by a leading edge 422, a trailing edge 424, and two sidewalls 426 and 428. The leading and trailing edges 422 and 424 are arranged opposite one another and substantially parallel to each other. The sidewalls 426 and 428 define beveled edges of the first writer 402. A vertical axis 423 is drawn to connect mid points 425 and 427 of edges 422 and 424, respectively, to indicate that the trapezoidal shape may be symmetrical about the axis 423, so that parts of the trapezoid that are divided by the axis 423 are mirror images of each other. In an alternate embodiment, pole tip 420 may be an asymmetrical trapezoid or may have any other suitable shape/geometry. First writer 402 has an actual width W1, which is a length of the trailing edge 424.

Second writer (Writer 2) 404 includes a main pole that defines a pole tip 430. In the embodiment shown in FIG. 4, pole tip 430 has a trapezoidal shape along the ABS. A perimeter of pole tip 430 is defined by a leading edge 432, a trailing edge 434, and two sidewalls 436 and 438. The leading and trailing edges 432 and 434 are arranged opposite one another and substantially parallel to each other. The sidewalls 436 and 438 define beveled edges of the second writer 404. A vertical axis 433 is drawn to connect mid points 435 and 437 of edges 432 and 434, respectively, to indicate that the trapezoidal shape may be symmetrical about the axis 433, so that parts of the trapezoid that are divided by the axis 433 are mirror images of each other. In an alternate embodiment, pole tip 430 may be an asymmetrical trapezoid or may have any other suitable shape/geometry. Second writer 404 has an actual width W2, which is a length of the trailing edge 434. Although first writer 402 and second writer 404 are described as being trapezoidal in shape, due to normal process variance, many pole tips are triangular in shape, i.e., leading edges 422 and 432 are zero.

In the embodiment of FIG. 4, the first and second return poles 406 and 408 are positioned adjacent to the respective leading and trailing edges of the pole tips 420 and 430, separated by the electrically insulating material 410. The first return pole 406 can be coupled to a yoke (not shown in FIG. 4) through a leading back gap closer and the second return pole 408 can be coupled to the main poles of both writers 402 and 404 through a trailing back gap via. It should be noted that a recording head such as 400 may include elements such as writer heaters, a reader heater, a thermal asperity sensor, etc., which are not shown in the interest of simplification.

As can be seen in FIG. 4, width W1 is greater than width W2. Selection of either writer 402 or writer 404 to be the operational writer when head 400 is employed in a data storage device such as 100 (of FIG. 1) may depend on whether W1 or W2 is closer to the median target width. Advantages of fabricating a recording head with two different target widths are described below in connection with FIG. 5. Thereafter, methods for testing/selecting one of a plurality of writers of a recording head for operation in a data storage device are described in connection with FIGS. 6-11.

Simulations indicate that, if two write poles are fabricated independently (i.e., their widths are uncorrelated) and the writer with a magnetic writer width (MWW) closest to a target MWW is selected, the effective MWW sigma (i.e., standard deviation) will be only about 60% of the intrinsic sigma of a single write pole. However, to be cost effective, it may be advantageous to fabricate both write poles simultaneously and therefore their pole widths and MWW will be highly correlated. In this case, a +/- offset from target MWW for each write pole is required to achieve optimal sigma.

Figure 5:
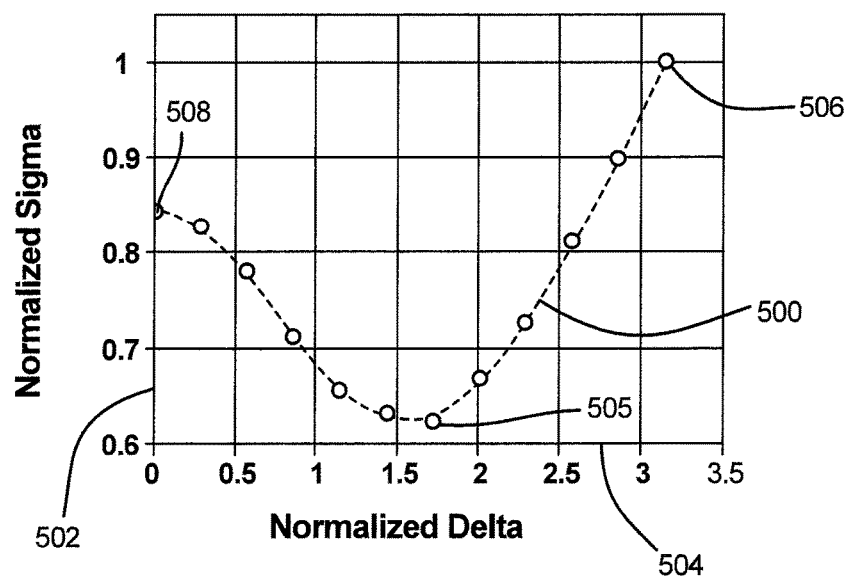
FIG. 5 is a graph including a plot that shows a dependence of effective pole width sigma on a difference between a narrow target width of one writer and a wide target width of another writer.

FIG. 5 is a graph including a plot 500 that shows a dependence of the effective pole width sigma on a difference between a narrow and a wide target width of Writer 1 and Writer 2, respectively. A vertical axis 502 represents net pole width sigma normalized to "intrinsic" sigma. A horizontal axis 504 represents Writer 1-Writer 2 targeting delta in units of "intrinsic" sigma. Widths of Writer 1 and Writer 2 are assumed to have a 90% correlation coefficient. As can be seen in FIG. 5, a lowest net sigma is obtained when a write pole width of Writer 1 and a write pole width of Writer 2 are targeted+/−0.85 sigma from the mean MWW target (i.e., about 1.7 sigma apart from each other), producing a reduction in sigma of about 37% (point 505 in FIG. 5) compared to the case of a single writer, which is denoted by 506 that indicates a normalized sigma value of 1 in plot 500. A normalized sigma value denoted by 508 is obtained when both Writer 1 and Writer 2 have the same MWW target. It should be noted that there are different ways of achieving the same or different MWW targets besides physical pole width. Also, physical pole width process variance may not be the greatest contributor to MWW variance. For example, two writers with the same pole width but different throat height dimension (behind the ABS) will have different MWW. Thus, in general, different target geometries (obtained by, for example, employing different widths and/or throat heights) may be used to achieve different MWW targets.

Figure 6:
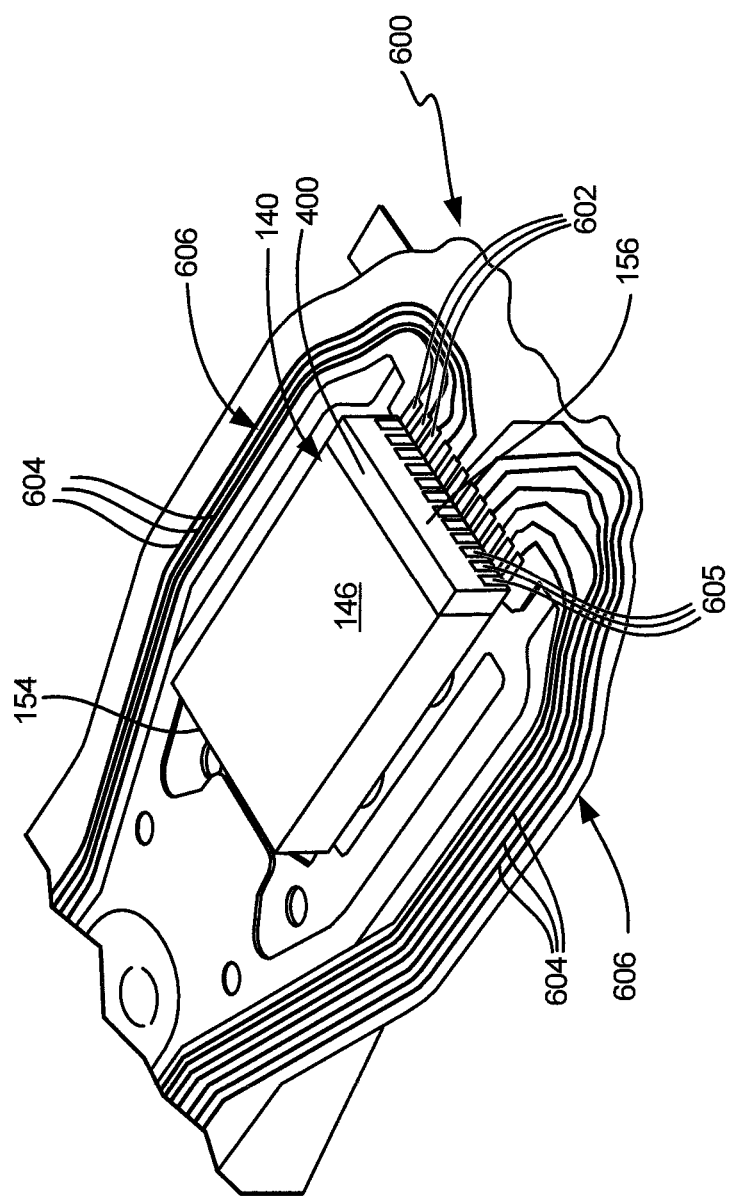
FIG. 6 is a diagrammatic illustration showing an interconnect portion providing an electrical interface to electrical elements of a recording head.
Figure 10A:
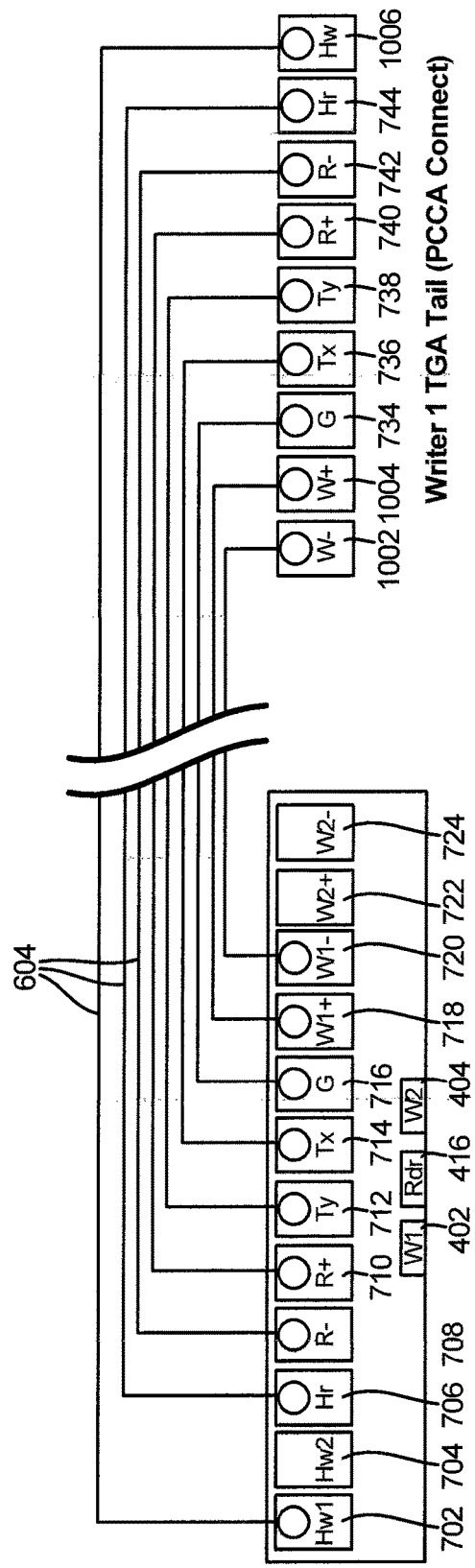
FIGS. 10A and 10B are schematic diagrams showing electrical connections between sliders and TGAs.
Figure 10B:
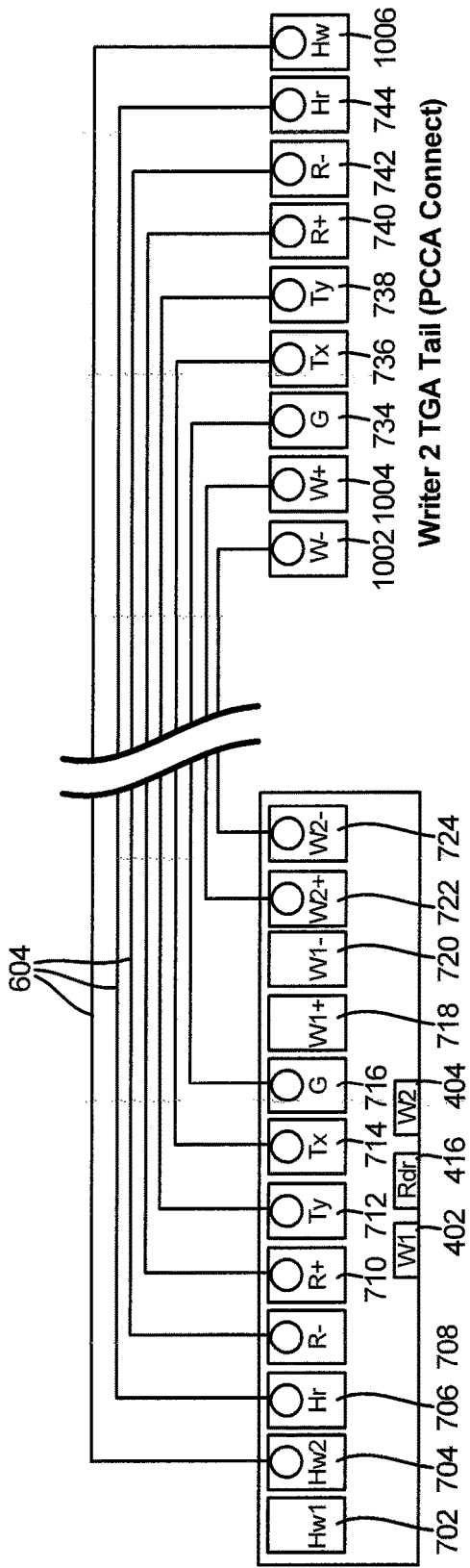

Methods of testing and selecting one of the writers (for example, either Writer 1 or Writer 2) to be operational in a data storage device are integral to taking advantage of the potential for reduced cost with the above-described embodiment. The methods involve electrically testing Writer 1 and Writer 2 of a recording head such as 400. FIG. 6 is an embodiment showing an interconnect portion 600, also known as trace gimbal assembly (TGA), providing an electrical interface to electrical elements of a recording head 400. In FIG. 6, slider 140 having a leading edge 154 and a trailing edge 156 is shown with its ABS 146 facing upwards. As can be seen in FIG. 6, the interconnect portion or TGA 600 includes a plurality of bond pads 602 coupled to the traces 604 along spaced gimbal arms 606 of a flex circuit extending along opposed sides of the slider 140 to electrically connect the transducer elements of the recording head 400 to the head circuitry 132 (shown in FIG. 1). In one embodiment, the traces 604 and bond pads 602 are formed of copper or other conductive material. Bond pads 602 connect to head/slider connection pads 605. Different schematic diagrams of slider-trace connections in accordance with certain embodiments are shown in FIGS. 7, 10A and 10B and described below.

Figure 7:
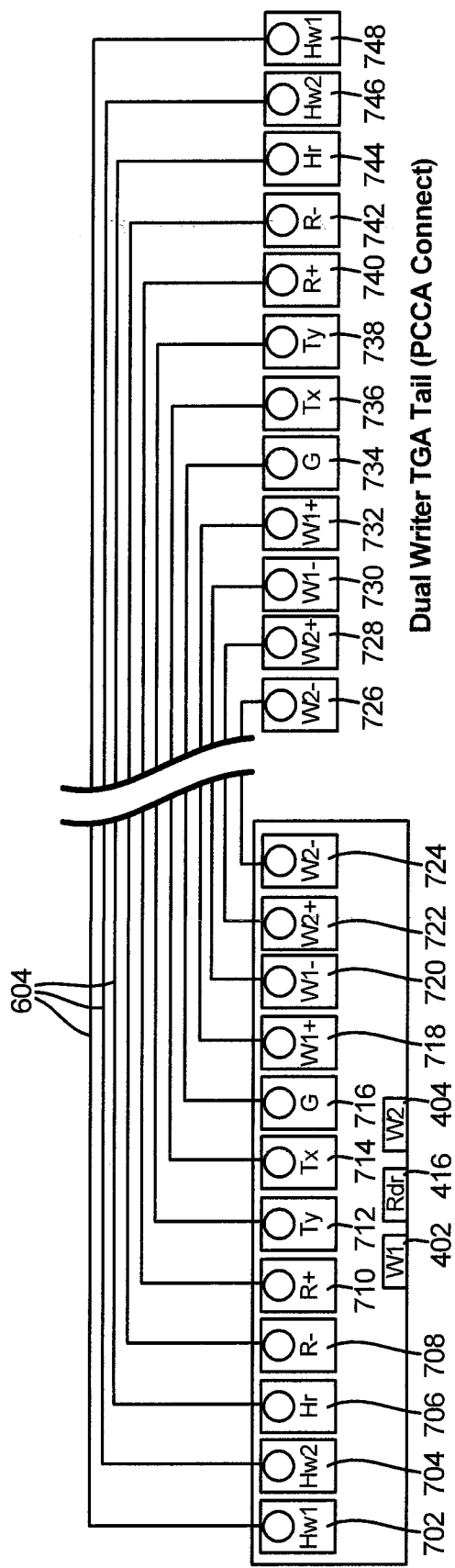
FIG. 7 is a schematic diagram showing electrical connections between a slider and a trace gimbal assembly (TGA).

FIG. 7 is a schematic diagram showing electrical connections between a slider including a recording head such as 400 having dual writers (for example, 402 and 404) and a TGA. In the embodiment of FIG. 7, both writers and writer heaters may be connected to PCCA 134 (shown in FIG. 1) of a disc drive, for example, thereby allowing for selected operation of the writers in the drive. The reader is represented by reference numeral 416. In the interest of simplification, internal slider connections are not shown. As can be seen in FIG. 7, the dual writer slider includes a plurality electrical connection pads. The pads include a heater for Writer 1 (Hw1) pad 702, a heater for Writer 2 (Hw2) pad 704, a heater for reader (Hr) pad 706, reader connection pads (R−) 708 and (R+) 710, thermal asperity detection sensor pads (Ty) 712 and (Tx) 714, a ground connection (G) pad 716, Writer 1 connection pads (W1+) 718 and (W1−) 720, and Writer 2 connection pads (W2+) 722 and (W2−) 724. Equivalent TGA connection pads 726-748 are included on the right side of FIG. 7. The interconnect traces are represented by reference numeral 604.

A can be seen in FIG. 7, both writers 402 and 404 (and the write heaters) are electrically connected via the TGA, such that test and selection of the optimal writer (402 or 404) can occur at a component spinstand tester and/or in the respective disc drive that employs the recording head. Choosing the optimal writer in the drive may allow for increased flexibility at drive certification with regard to final capacity. This could include, for example, choosing one writer for a drive using shingled magnetic recording (SMR) and targeting a higher capacity point.

The embodiment in FIG. 7 provides maximum flexibility, but it is not the lowest cost solution, however, as it drives additional interconnect traces and perhaps an additional write driver and heater driver, or preamplifier switches, in the drive. An alternate embodiment is to test and select the optimal writer using a slider dynamic electrical test (SDET). A general embodiment of a head suspension assembly that may be employed in a slider tester is described below in connection with FIG. 8. Thereafter, a method of testing a dual writer recording head is described in connection with FIG. 9.

Figure 8:
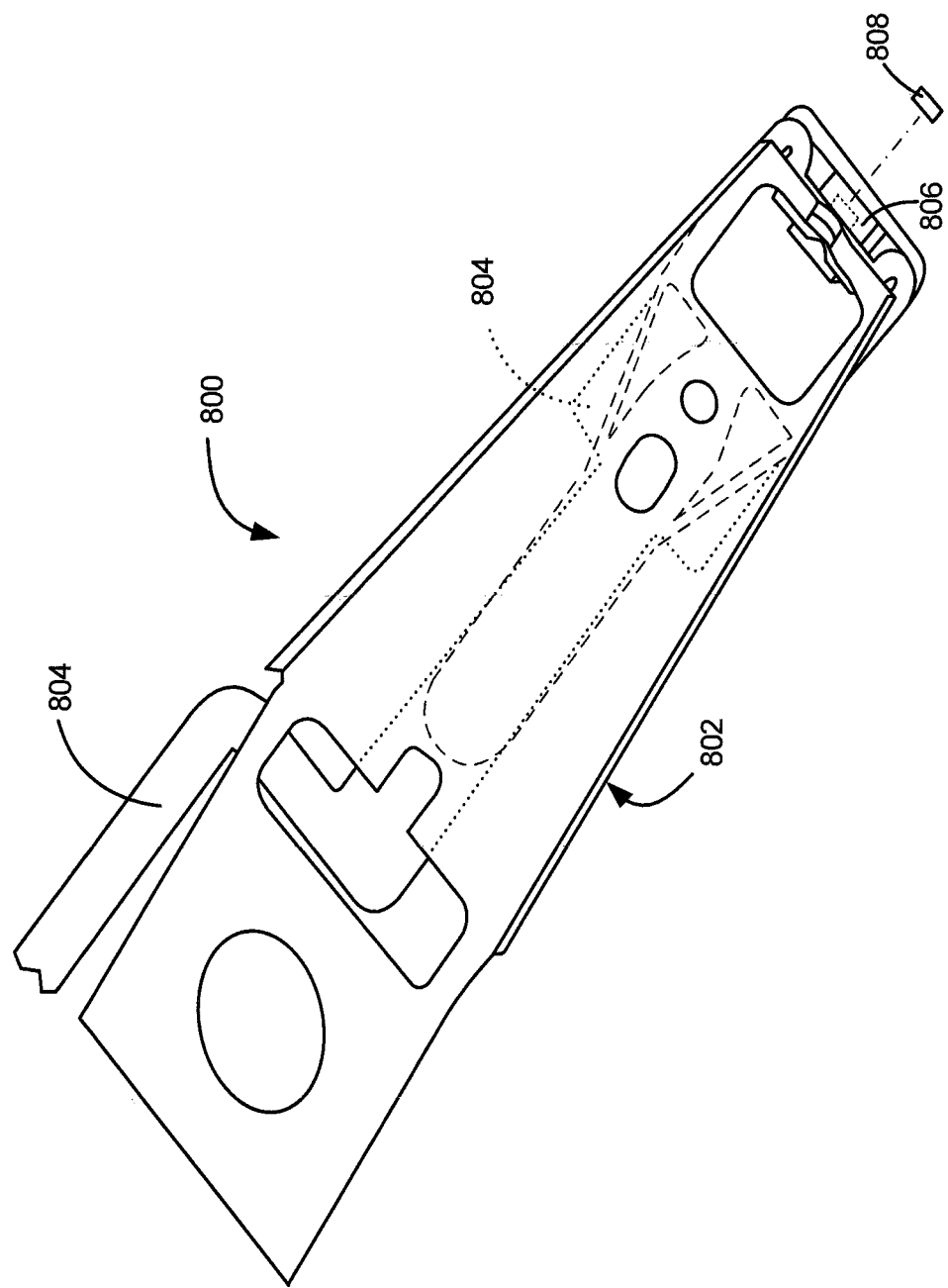
FIG. 8 is a diagrammatic illustration of a head suspension assembly that may be utilized in a slider tester.

FIG. 8 is a diagrammatic illustration of a head suspension assembly 800 that may be utilized in a slider tester. In the interest of simplification, components such as a recording disc, spindle motor, controller, etc., that may be employed in the slider tester are not shown. Head suspension 800 includes load beam assembly 802, a flex circuit 804 and a socket 806 that releasably secures slider 808, which may include a recording head such as 400. The flex circuit 804 has connectors (not shown) that turn inwardly to make connection to electrical contacts (not illustrated here) on the main body of socket 806. Slider 108 is releasably secured to socket 106 and can therefore be easily inserted and removed for testing. Details of socket 806 including its electrical connectors are excluded in the interest of simplification. An embodiment for testing a dual writer slider is described below in connection with FIG. 9.

Figure 9:
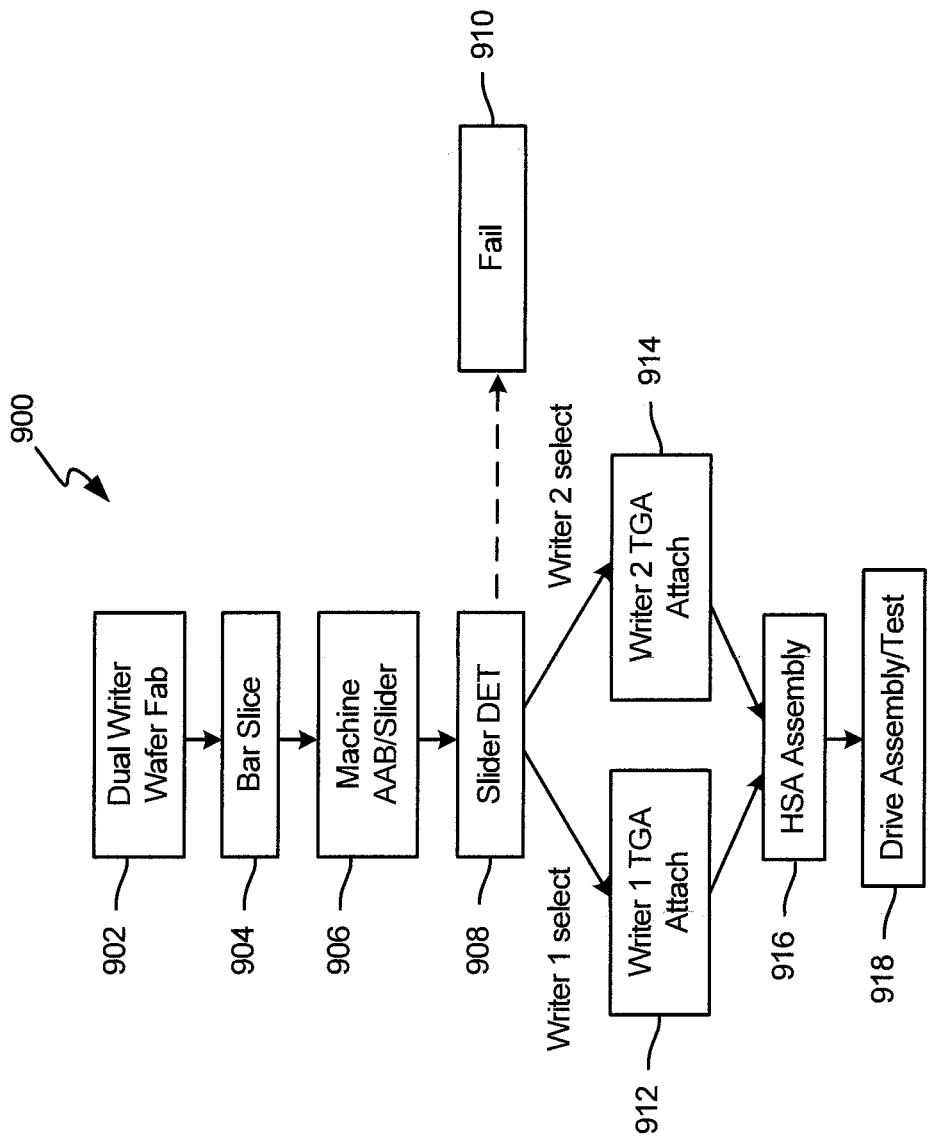
FIG. 9 is a simplified flow diagram of a method of testing a dual writer slider in accordance with one embodiment.

FIG. 9 is a simplified flow diagram 900 of a method of testing a dual writer slider in accordance with one embodiment. At step 902, fabrication of a dual writer wafer is carried out as described above in connection with FIG. 3. Thereafter, the fabricated wafer is sliced into bars at step 904 and machined to form sliders with air bearing surfaces at step 906. Both steps 904 and 906 may be carried out in a manner described above in connection with FIG. 3. At step 908, a SDET may be carried out using a slider tester having a suspension assembly such as 800, which allows for insertion, testing, and subsequent removal of the slider. If the slider fails tests carried out by the slider tester, the failed slider may be set aside or discarded at step 910. If the slider passes tests carried out in the slider tester and Writer 1 is selected, Writer 1 is attached to a TGA at step 912. If the slider passes tests carried out in the slider tester and Writer 2 is selected, Writer 2 is attached to a TGA at step 914. At step 916, the selected writer (Writer 1 or Writer 2) with its attached TGA is connected in a head stack assembly (HSA). Thereafter, at step 918, remaining portions of the drive are assembled, and the assembled drive is tested.

The method described above in connection with FIG. 9 may involve sorting the tested slider population into three different test result groups such as "Writer 1," Writer 2" and "Fail." The Writer 1 and Writer 2 groups would each then have their own unique TGA interconnect assembly to which they would be mated. This is shown in FIGS. 10A and 10B that illustrate slider and TGA interconnect schematics for a Writer 1 selected slider/TGA and a Writer 2 selected slider/TGA, respectively. As can be seen in FIGS. 10A and 10B, the tail pad layouts of both TGAs are identical. In the interest of simplification, internal slider connections not shown in FIGS. 10A and 10B. In FIGS. 10A and 10B, the same reference numerals used in FIG. 7 are utilized for similar/corresponding elements. Also, in the interest of brevity, a description of those similar elements is not repeated. As can be seen in FIGS. 10A and 10B, pad Hw (1006) can be connected to either Hw1 (702) or Hw2 (704). Similarly, W− (1002) can be connected to W1− (720) or W2− (724) and W+ (1004) can be connected to W1+ (718) or W2+ (722). Since the opposite (PCCA connect) end of the TGAs or the tail pad layouts are substantially identical, minimal to no additional hardware or test/optimization cost would be required to accommodate both groups of heads (i.e., heads with Writer 1 selected or heads with Writer 2 selected) in the drive.

While an aspect of this disclosure is for each writer to have a separate pole width target, the selection method need not be limited to MWW, particularly if both writers have MWW close to the median target. The operational writer can also be selected based on other parameters such as (but not limited to) bit error rate (BER), areal density capability (ADC), overwrite (OVW), adjacent track interference (ATI), erasure after writing (EAW), or a combination thereof.

While the current embodiments show separate, independent pads/connections for each of the writer coils and writer heaters, alternate embodiments may contain one or more pad sharing schemes between Writer 1 and Writer 2 and Heater 1 and Heater 2, for example.

Figure 11:
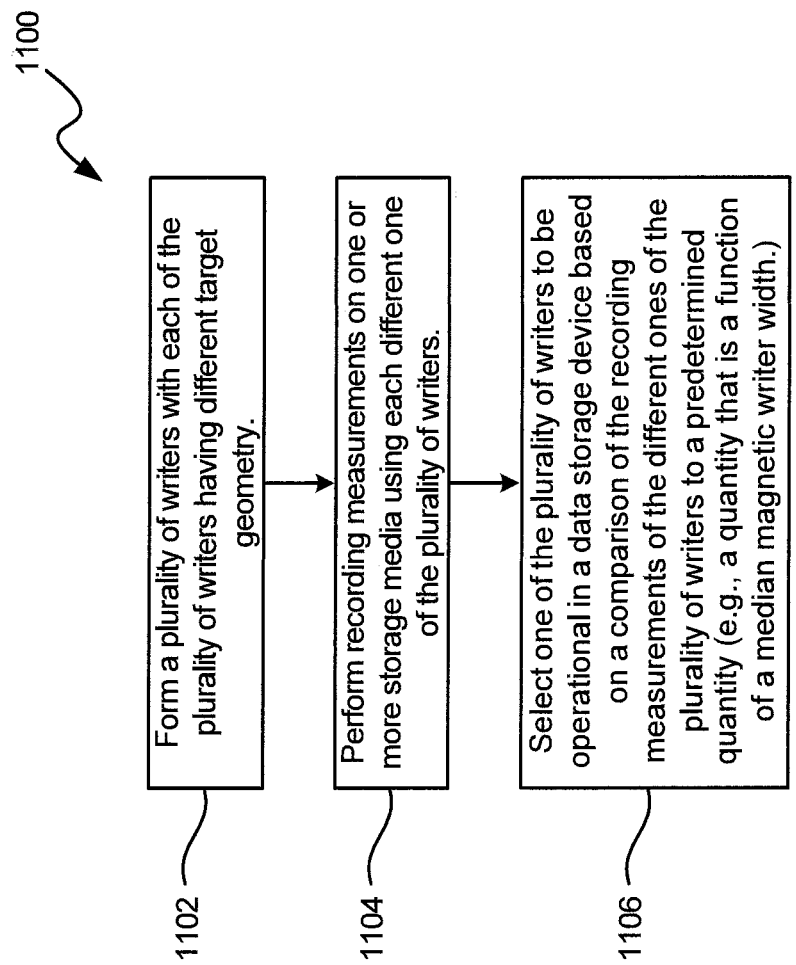
FIG. 11 is a simplified flow diagram of a general method embodiment.

FIG. 11 is a simplified flow diagram 1100 of general method embodiment. At step 1102, a plurality of writers is formed with each of the plurality of writers having a different target geometry. At step 1104, recording measurements are performed on one or more storage media using each different one of the plurality of writers. At step 1106, one of the plurality of writers is selected to be operational in a data storage device based on a comparison of the recording measurements of the different ones of the plurality of writers to a predetermined quantity.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be reduced. Accordingly, the disclosure and the figures are to be regarded as illustrative rather than restrictive.

One or more embodiments of the disclosure may be referred to herein, individually and/or collectively, by the term "invention" merely for convenience and without intending to limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments.

The above-disclosed subject matter is to be considered illustrative, and not restrictive, and the appended claims are intended to cover all such modifications, enhancements, and other embodiments, which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method comprising:
forming at least one recording head having first and second writers of different geometries, with one of the first or the second writer being operational to record user data on one or more data storage media in a data storage device, and the other one of the first or the second writer never being operational to store user data in the data storage device.

2. The method of claim 1 and wherein forming the at least one recording head having the first and second writers of different geometries comprises:
forming the first writer with a first target width; and
forming the second writer with a second target width.

3. The method of claim 2 and wherein the first target width is wider than a median target width and the second target width is narrower than the median target width.

4. The method of claim 2 and further comprising forming a bearing surface, and wherein the first writer has a first pole tip that defines a first trapezoidal or triangular perimeter along the bearing surface, and wherein the second writer has a second pole tip the defines a second trapezoidal or triangular perimeter along the bearing surface.

5. The method of claim 4 and wherein the first target width is a target width for a trailing edge of the first trapezoidal or triangular perimeter, and wherein the second target width is a target width for a trailing edge of the second trapezoidal or triangular perimeter.

6. The method of claim 1 and wherein the first writer and the second writer are formed to be substantially in a same plane.

7. A method comprising:
forming at least one recording head having first and second writers of different geometries, with one of the first or the second writer being electrically connected, by trace connections, to record user data on one or more data storage media in a data storage device, and the other one of the first or the second writer not connected by trace connections, thereby being non-operational in the data storage device.

8. The method of claim 7 and wherein forming the at least one recording head having the first and second writers of different geometries comprises:
forming the first writer with a first target width; and
forming the second writer with a second target width.

9. The method of claim 8 and wherein the first target width is wider than a median target width and the second target width is narrower than the median target width.

10. The method of claim 8 and further comprising forming a bearing surface, and wherein the first writer has a first pole tip that defines a first trapezoidal or triangular perimeter along the bearing surface, and wherein the second writer has a second pole tip the defines a second trapezoidal or triangular perimeter along the bearing surface.

11. The method of claim 10 and wherein the first target width is a target width for a trailing edge of the first trapezoidal or triangular perimeter, and wherein the second target width is a target width for a trailing edge of the second trapezoidal or triangular perimeter.

12. The method of claim 7 and wherein the first writer and the second writer are formed to be substantially in a same plane.

13. A data storage device comprising:
one or more data storage media; and
at least one recording head having first and second writers of different geometries, with one of the first or the second writer being electrically connected, by trace connections, to record user data on one or more data storage media in a data storage device, and the other one of the first or the second writer not connected by trace connections, thereby being non-operational in the data storage device.

14. The data storage device of claim 13 and wherein the first writer and the second writer are substantially coplanar.

15. The data storage device of claim 13 and further comprising a bearing surface, and wherein the first writer has a first pole tip that defines a first trapezoidal or triangular perimeter along the bearing surface, and wherein the second writer of the plurality of writers has a second pole tip that defines a second trapezoidal or triangular perimeter along the bearing surface.

16. The data storage device of claim 15 and wherein a trailing edge of the first trapezoidal or triangular perimeter has a first length that is greater than a second length of a trailing edge of the second trapezoidal or triangular perimeter.

17. The data storage device of claim 13 and wherein a width of the first writer is different from a width of the second writer.

18. The data storage device of claim 13 and wherein a throat height of the first writer is different from a throat of the second writer.

19. The data storage device of claim 13 and wherein the trace connections are provided by a generic trace that is configured to couple to either the first writer or the second writer.

20. The data storage device of claim 13 and wherein the first writer comprises a first heater and the second writer comprises a second heater.

* * * * *

UNITED STATES PATENT AND TRADEMARK OFFICE
CERTIFICATE OF CORRECTION

PATENT NO. : 10,559,319 B2
APPLICATION NO. : 16/360770
DATED : February 11, 2020
INVENTOR(S) : Kurt Wiesen et al.

It is certified that error appears in the above-identified patent and that said Letters Patent is hereby corrected as shown below:

In the Claims

In Column (9), Line 33, Claim 4 change "the" to --that--.

In Column (10), Line 8, Claim 10 change "the" to --that--.

Signed and Sealed this
Seventh Day of April, 2020

Andrei Iancu
*Director of the United States Patent and Trademark Office*